UNITED STATES PATENT OFFICE.

WILLIAM W. CAMPBELL, OF INDIANAPOLIS, INDIANA, ASSIGNOR OF ONE-HALF TO WILLIAM H. THOMAS, OF SAME PLACE.

CEMENTING COMPOSITION.

SPECIFICATION forming part of Letters Patent No. 278,681, dated June 5, 1883.

Application filed April 14, 1883. (No specimens.)

*To all whom it may concern:*

Be it known that I, WILLIAM W. CAMPBELL, a citizen of the United States, residing at Indianapolis, in the county of Marion and State of Indiana, have invented a new and useful composition of matter to be used as a cement for securing paper, leather, or other like substances to metal, of which the following is a specification.

The object sought in my compound is to provide a cement which, when it is applied to a metallic surface, will not scale therefrom when dry, but will adhere closely thereto, and possess, when dry, a tough adhesive character.

My composition consists of the following essential ingredients, combined in about the proportions stated, as follows: pure water, seven and one-half gallons; good glue, ten pounds; acetic acid, eight pounds; rye-flour, twenty pounds.

The relative proportions of glue and flour may be slightly varied—that is, a little more flour and less glue, or vice versa—without departing from the spirit of my invention.

The above ingredients are compounded in the following manner: The glue is first melted in about three gallons of the water over a moderate heat. The rye-flour is then thoroughly mixed with the remaining cold water, to which mixture the acetic acid is then added, and the whole poured into the melted glue and thoroughly boiled and cooked over a hot-water bath. When the cement is to be kept for any considerable length of time, I add to the mixture, when cold, one gallon of alcohol; but when the cement is designed for immediate use the alcohol is unnecessary. The cement, when applied to a metallic surface—as the periphery of an iron pulley—causes a covering of paper or other material to adhere closely and tenaciously without scaling off, as does ordinary glue.

I claim as my invention—

1. A cement composed, essentially, of water, glue, rye-flour, and acetic acid, compounded substantially as above described.

2. The herein-described composition of matter to be used as a cement, consisting of water, glue, rye-flour, and acetic acid in the proportions specified.

WILLIAM W. CAMPBELL.

Witnesses:
H. P. HOOD,
FRANK A. JACOB.